United States Patent [19]

Suarez-Gonzalez

[11] Patent Number: 4,708,474
[45] Date of Patent: Nov. 24, 1987

[54] REFLECTION CORRECTED RADIOSITY OPTICAL PYROMETER

[75] Inventor: Ernesto Suarez-Gonzalez, Tequesta, Fla.

[73] Assignee: United Technologies Corporation, Hartford, Conn.

[21] Appl. No.: 798,212

[22] Filed: Nov. 14, 1985

[51] Int. Cl.⁴ ................................................ G01J 5/60
[52] U.S. Cl. .......................................... 356/45; 356/43; 374/127
[58] Field of Search ............................. 356/43, 44, 45; 374/120, 121, 127, 210

[56] References Cited

U.S. PATENT DOCUMENTS

| 4,222,663 | 9/1980 | Gebhart et al. | 356/45 |
| 4,326,798 | 4/1982 | Kahn | 356/45 |
| 4,619,533 | 10/1986 | Lucas et al. | 356/45 X |

OTHER PUBLICATIONS

T. G. R. Beynon, "Radiation Thermometry Applied to the Development and Control of Gas Turbine Engines", *American Institute of Physics*, 1982, pp. 471–477.

W. H. Atkinson, R. R. Strange, "Pyrometer Temperature Measurements in the Presence of Reflected Radiation", *Proceedings of the Conference of the American Society of Mechanical Engineers*, Aug. 1976, pp. 1–8.

Primary Examiner—Eugene R. LaRoche
Assistant Examiner—Robert J. Pascal
Attorney, Agent, or Firm—J. Kevin Grogan

[57] ABSTRACT

A reflection corrected radiosity optical pyrometer includes an optical guide for receiving a target optical beam from a turbine blade in a jet engine. The target optical beam is provided to a detector module that divides the target optical beam into two beams, one having a spectral width selected to be less than the target optical beam spectral width. A signal processor receives signals from the detector module indicative of the energy of the two beams, calculates a reflection corrected energy signal directly therefrom and provides a correct target temperature signal.

2 Claims, 5 Drawing Figures

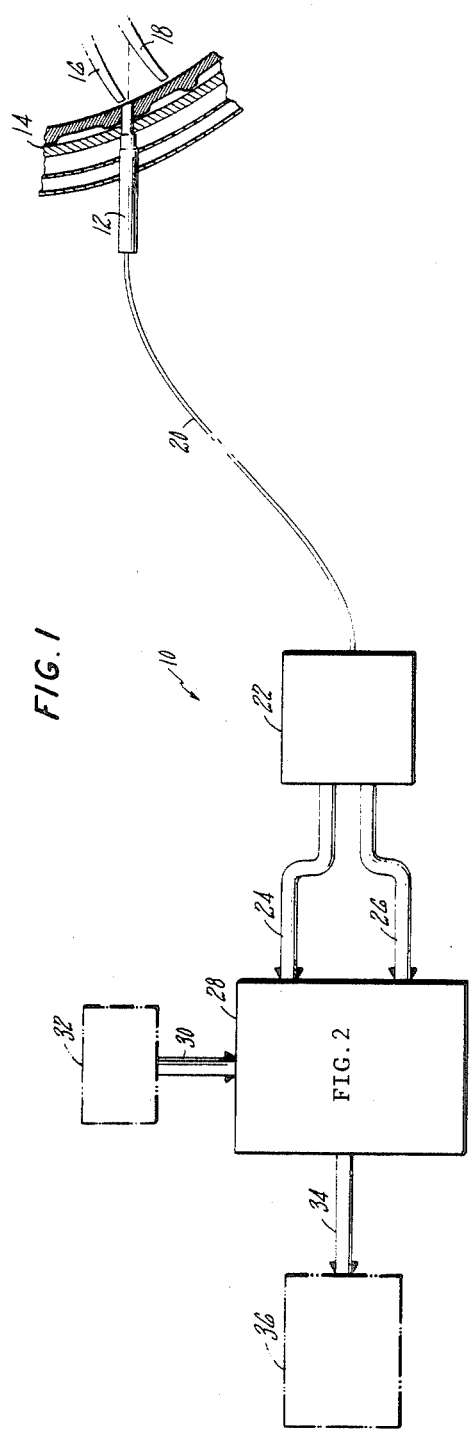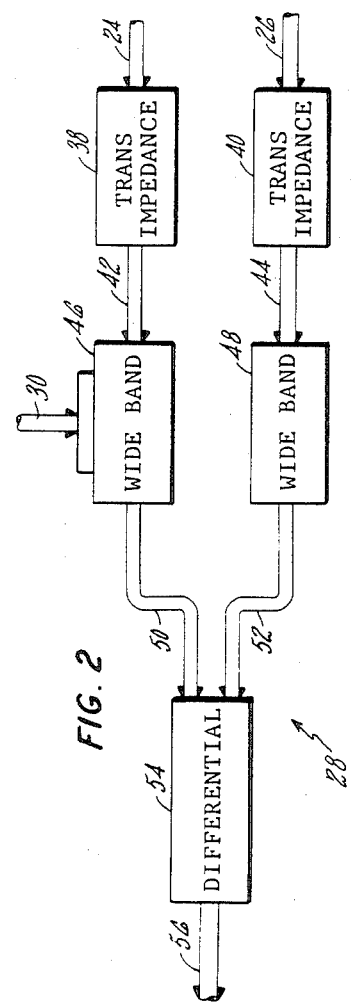

REFLECTION CORRECTED RADIOSITY OPTICAL PYROMETER

TECHNICAL FIELD

This invention relates to optical pyrometers and more particularly to dual spectra optical pyrometers with differential energy signal processing.

BACKGROUND ART

Optical pyrometers are well known in the art, having found extensive use in applications in severe environments or where temperature magnitudes prohibit the use of conventional contact pyrometric techniques. These devices calculate the temperature of a target from the radiant energy provided therefrom. An algorithm is used to determine the temperature of the surface by measuring total radiation in a given wavelength interval or by looking at the distribution of optical energy as a function of wavelength. The higher the temperature of the source, the greater the proportion of optical energy in the shorter wavelengths.

Optical pyrometers have been developed to measure the temperature of turbine blade surfaces even in an operating jet engine whose environment necessarily includes the combustion flame fireball. To accurately measure the turbine blade temperature, the optical pyrometer must be capable of correcting the measurements to eliminate the effect of the presence of reflected combustion flame radiation which is mixed in and obscures radiation from the turbine blade.

Dual spectral area optical pyrometers have been developed in order to differentiate between reflected and emitted radiation received from a target turbine blade and compensate for the error in the observed temperature that the reflected radiation introduces. In U.S. Pat. No. 4,222,663, Gebhart, et al discloses a dual band (two color) optical pyrometer which comprises two separate pyrometers. Each pyrometer sees a different but overlapping component of the total spectral range of the light or radiation from the turbine blade.

The pyrometers are sensitive at different wavelength bands and will be affected differently by the energy from the turbine blade surface. When the light (radiation) from the fireball is reflected off the blade, the pyrometer set to detect the shorter wavelength band is more responsive to the additional reflected energy, and its output signal increases in greater proportion than does that of the longer wavelength pyrometer. Therefore, an increase or decrease in the amount of the reflected radiation or, at high reflection conditions, to the temperature of the combustion flame will result in a proportionally higher or lower value of temperature indicated in the short wavelength pyrometer.

For each pyrometer an algorithm calculates the temperature of the turbine blade from the light it receives. This process, which requires linearizing the relationship between the received power and temperature, is complex and degrades the temporal responsivity of the system. The linearized temperature signals indicate the equivalent black body temperature of the turbine blade. However, the reflected energy of the much hotter combustion flame will cause each of the two pyrometers to yield different temperature values, both higher than the true blade temperature. An additional temperature correction algorithm receives each channel temperature and determines the magnitude of the temperature error. The temperature correction signal is a function of the difference between the two pyrometer temperatues, which results from the spectral range of each pyrometer, the fireball equivalent black body temperature and the fraction of reflected radiation present in each pyrometer signal. Computation of a temperature correction signal is a laborious, hardware intensive process and has limited the applicability of dual spectra optical pyrometers to ground based diagnostic use.

DISCLOSURE OF INVENTION

An object of the present invention is to provide a reflection corrected radiosity optical pyrometer having differential energy signal processing for measuring the temperature of a remote target.

According to the present invention, a reflection corrected radiosity optical pyrometer includes an optical guide for receiving from the target an optical beam that has a spectral width and has an emitted component from the target and a reflected component from a fireball that has an equivalent temperature. A detector module receives and divides the target optical beam into first and second optical beams and provides electrical signal equivalents thereof. The second optical beam is selected to have a spectral width that is a portion of the target beam spectral width. Also included is a signal processor that provides for receiving the first and second signals as well as an energy ratio signal. The signal processor provides reflection corrected energy signals from a difference between the first signal and the product of the energy ratio signal and the second signal.

According to another aspect of the present invention, a digital reflection corrected radiosity optical pyrometer includes an optical guide for receiving from the target an optical beam that has a spectral width and has an emitted component from the target and a reflected component from a fireball that has an equivalent temperature. A detector module receives and divides the target optical beam into first and second optical beams and provides electrical signal equivalents thereof. The second optical beam is selected to have a spectral width that is a portion of the target beam spectral width. Also included is a digital signal processor that has a memory means for storing signals. These signals include those indicative of a plurality of correct target temperature values, each corresponding to an associated reflection corrected energy signal (E) signal magnitude. The digital signal processor also provides for receiving the first and second signals as well as an energy ratio signal. The signal processor generates reflection corrected energy signals from a difference between the first signal and the product of the energy ratio signal and the second signal. The signal processor further identifies each of the reflection corrected energy signals with the related one of the plurality of correct target temperature signals stored in memory and outputs a correct target temperature signal therefrom.

BRIEF DESCRIPTION OF THE DRAWINGS

FIG. 1 is a block diagram of a reflection corrected radiosity optical pyrometer according to the present invention;

FIG. 2 is a block diagram of an analog signal processor for use with the optical pyrometer of FIG. 1;

BEST MODE FOR CARRYING OUT THE INVENTION

Figure 3:
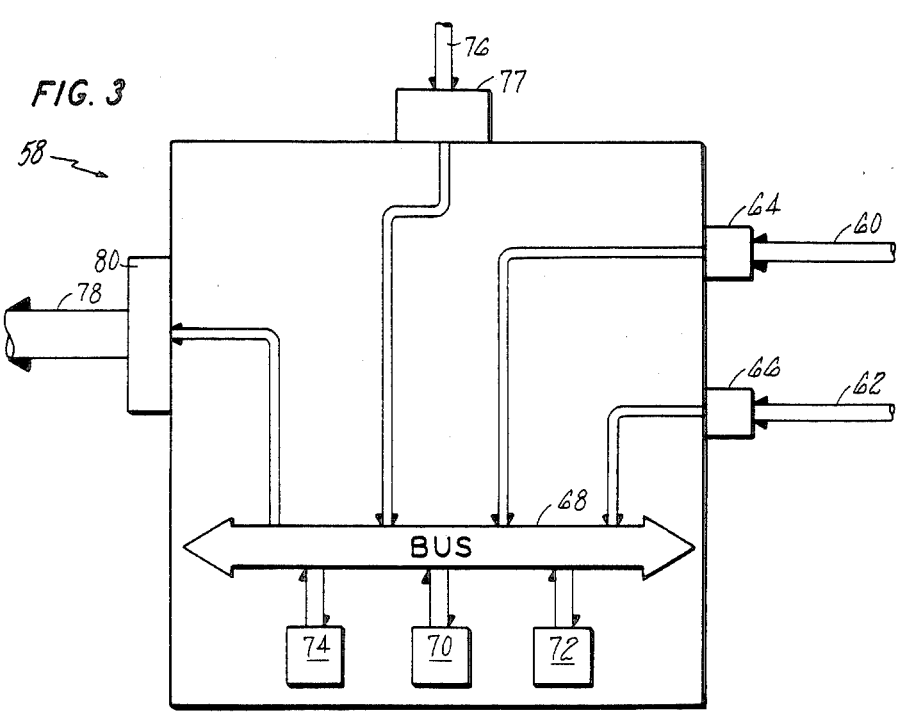
FIG. 3 is an illustration of a digital embodiment of the signal processor of FIG. 2.

Referring first to FIG. 1, in a simplified block diagram of a pyrometer provided according to the present invention, a reflection corrected radiosity optical pyrometer 10 includes probe 12 mounted in casing 14 of a gas turbine jet engine. The probe should be positioned to optically view a target such as rotating turbine blades 16 and 18.

In an operating jet engine the blades of the turbine emit thermal radiation, the intensity and spectral distribution of which is described by the well known "black body" approximation. If variation in emissivity are taken into account, the approximation is conventionally referred to as a "grey body". In addition, light from the jet engine combustion flame or fireball is reflected off the turbine blade. The temperature of the fireball is substantially higher than that of the turbine blade, and the sum of the two light beams produces a spectral energy distribution which yields an equivalent black body temperature higher than the actual temperature of the turbine blade.

The sum spectral energy, or target optical beam, from the turbine blades is collected by the probe. The probe may include lenses and such other conventional optical components, as is necessary to enhance the probe's light gathering and focusing capabilities. In other aspects, the probe is of a conventional design and includes such elements as a housing for the optical fiber, internal optical reflection damping mechanisms, and provisions for purge gas flow through the probe housing. Those skilled in the art will recognize that substitutions and modifications can be made depending upon the pyrometer's use as a diagnostic or in-flight pyrometer, and depending on each engine type.

An optical guide 20 provides the target optical beam to detection module 22. Typically the guide comprises a fused fiber optic bundle or equivalently a conventional wide band quartz or fused silica fiber. The detection module is also conventional and divides the target optical beam into two components. A first photodetector (not shown) absorbs a first one of the components having a spectral width selected to be a portion of the target optical beam. In the best mode embodiment the detection module comprises a bifurcated fiber optic coupler (not shown) with a conventional optical filter (not shown) inserted into one of the two optical beams provided therefrom. A second photodetector (not shown) receives the remaining target optical beam component from the bifurcated fiber optic coupler.

Photodetectors 1 and 2 typically comprise silicon and have a spectral response from 0.4 microns through 1.05 microns. In the best mode embodiment a difference in spectral bandwith is created by inserting a conventional optical filter before the first photodetector, limiting the spectral band for that photodetector to 0.4–0.85 microns. Those skilled in the art will note that widths of the spectral bands can vary and should be selected according to the application.

The first photodetector provides signals on lines 24 which are indicative of the target optical beam first (filtered) component signal ($E_f$) and the second photodetector provides signals on lines 26 indicative of the target optical beam second (unfiltered) signal ($E_u$).

These signals are received by signal processor 28. As detailed hereinafter the signal processor computes a reflection corrected energy signal (E) defined as the difference signal magnitude between the filtered and unfiltered component signals:

$$E = E_u - RE_f \quad (1)$$

where R is an energy ratio signal defined hereinafter with respect to FIG. 2 and is received on lines 30 from external apparatus 32.

The parameter E is directly related to the true temperature of the blade. Given an equivalent black body temperature of the fireball and knowing the spectral characteristics of the photodetectors and filters, a functional relationship can be determined between the correct temperature and the reflection corrected energy signal (E). Although this relationship is double valued over a range of temperatures, it is single valued over the temperature range of interest.

Unlike prior art dual spectra optical pyrometers which must linearize both $E_u$ and $E_f$ energy signals and determine a black body temperature for each, the reflection corrected radiosity optical pyrometer of the present invention does not require linearization of either energy signal. The dynamic range of the reflection corrected energy signal (E) is substantially smaller than that of the filtered and unfiltered energy signals, reducing signal processing speed by simplifying the needed computations.

FIG. 2 is an expanded block diagram of the signal processor 28 used in the pyrometer of FIG. 1. The target optical beam from the turbine blade comprises thermal energy $E_t$ that is the sum of the energy emitted by the blade ($E_b$), and the reflected energy ($E_r$) of the combustion flame off the blade, namely $$E_t = E_b + E_r \quad (2)$$

Since the target optical beam is divided by the detection module into filtered ($E_f$) and unfiltered ($E_u$) beams with different spectral widths, the total filtered and unfiltered energy can be expressed as $$E_u = E_{ub} + E_{ur} \quad (3)$$

$$E_f = E_{fb} + E_{fr} \quad (4)$$

At a given reflected energy equivalent black body temperature, the energy ratio between the filtered and unfiltered beams is constant, that is $$E_{ur}/E_{fr} = \text{constant} = R \quad (5)$$

Consequently, the equation for the energy in the total unfiltered beam can be rewritten as $$E_u = E_{ub} + RE_{fr} \quad (6)$$

The filtered, reflected energy becomes $$E_{fr} = E_f - E_{fb} \quad (7)$$

Substituting the expression for the filtered reflected energy ($E_{fr}$) into the equation for the total unfiltered energy results in $$E_u - RE_f = E_{ub} - RE_{fb} \quad (8)$$

The reflection corrected energy (E) can be defined from equation (8)

$$E_u - RE_f = E = RE_{ub} - E_{fb} \qquad (9)$$

The lefthand side of equation (9) is the total (emitted plus reflected) filtered and unfiltered energy, while the righthand side is the blade emitted energy. Consequently, the parameter E is a function only of the emitted energy from the turbine blade and remains unaffected by the presence of reflected energy from the combustion flame. Moreover, E can be obtained from the total observed energy in both the unfiltered and filtered signal channels, along with knowledge of the magnitude of the energy ratio.

The value of the energy ratio R for the fireball is computed and empirically verified by illuminating the detector module with radiation from a black body at a temperature which is approximately equal to the equivalent black body fireball temperature within the jet engine (e.g. 4500° F.).

Similarly, the relationship between E and the reflection corrected temperature is computed and empirically verified by supplying black body radiation of various temperatues (approximately 1300° F.) to the detection module for a given value of R. For each power ratio value of interest, a similar relationship is obtained. Once the relationship between E and the correct temperature is established, the configuration of the signal processor can then be determined.

In the best mode embodiment, the signals are processed in analog form. For in-flight pyrometer applications, analog signal processing provides for high speed and hardware simplicity. Unfiltered ($E_u$) and filtered ($E_f$) energy signals are received on lines 24 and 26 respectively and comprise photocurrent from photodetectors within the detector module (22, FIG. 1). Conventional transimpedance amplifiers 38 and 40 receive the energy signals and provide equivalent voltages on lines 42 and 44 to conventional wide band amplifiers 46 and 48. In addition, signals indicative of the power ratio magnitude (R) are received by amplifier 46 on lines 30. In the embodiment shown the magnitude of R corresponds to the amplifier gain.

The wide band amplifiers $E_u$ and $RE_f$ signals are provided on lines 50 and 52 to a conventional difference amplifier 54 which provides the reflection corrected energy signals as defined hereinabove on lines 56. Depending upon the application, the reflection corrected energy signals may be used in present form as part of an engine feedback control circuit. Alternatively, the reflection corrected energy signals may be provided to external signal processors not shown and not part of the present invention, such as an on-board flight controller where they may be digitized and compared with reflection corrected energy signal magnitudes stored as a function of correct blade temperature in conventional look-up table format.

FIG. 3 is an alternative digital embodiment 58 of the signal processor of FIG. 2.

The signal processor receives on lines 60 and 62 signals indicative of the unfiltered ($E_u$) and filtered ($E_f$) energy, respectively. These signals are converted by analog-to-digital converters 64 and 66 and are provided to bus 68. The signal processor includes conventional central processing unit (CPU) 70 and random access memory (RAM) 72 for storing signals. A compilation relating reflection corrected energy signals to correct temperature signals is stored in read only memory (ROM) 74 in conventional look-up table format.

The central procession unit computes the value of E from the input energy signals and an energy ratio signal received on lines 76 and digitized by digital to analog converter 77. With a reflection corrected energy signal magnitude, the signal processor selects the corresponding correct temperature signal value from the read only memory. The randon access memory is accessed by the central processing unit when necessary during this process. Signals corresponding to the correct temperature are provided by the signal processor directly on lines 78.

Figure 4:
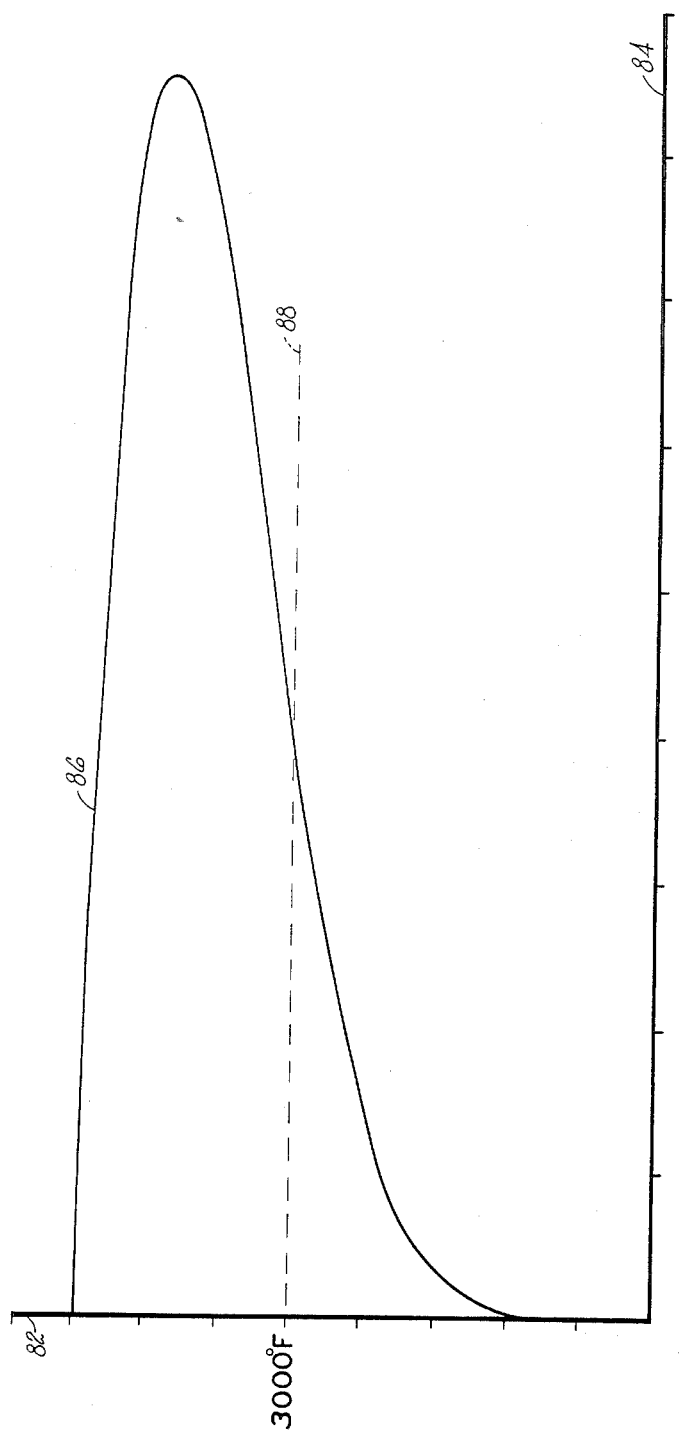
FIG. 4 is a waveform illustration of a parameter used in the description of the signal processor of FIG. 2.

FIG. 4 is a diagram illustrating a typical relationship between E and correct temperature value. Axes 84 and 82 correspond to E and correct temperature, respectively. Curve 86 corresponds to the value of the parameter E. It is apparent from inspection that the function E is double valued over the total range of temperature. However, the B value range of interest is limited to over the total range of temperature temperatures below 3000° F. which corresponds to the region below dashed line 88.

Those skilled in the art will note that the reflection corrected energy (E) has a magnitude range substantially less than either input energy signal from photodetectors 1 or 2. With a reflection corrected radiosity optical pyrometer provided in accordance with the present invention, there is an approximate order of magnitude reduction in the range of the reflection corrected signal because the reflection corrected energy is a function of the difference between the unfiltered and filtered energy. The reduction in signal range allows for improvements in frequency response, and represents a significant advantage over prior art dual spectral area pyrometers.

Figure 5:
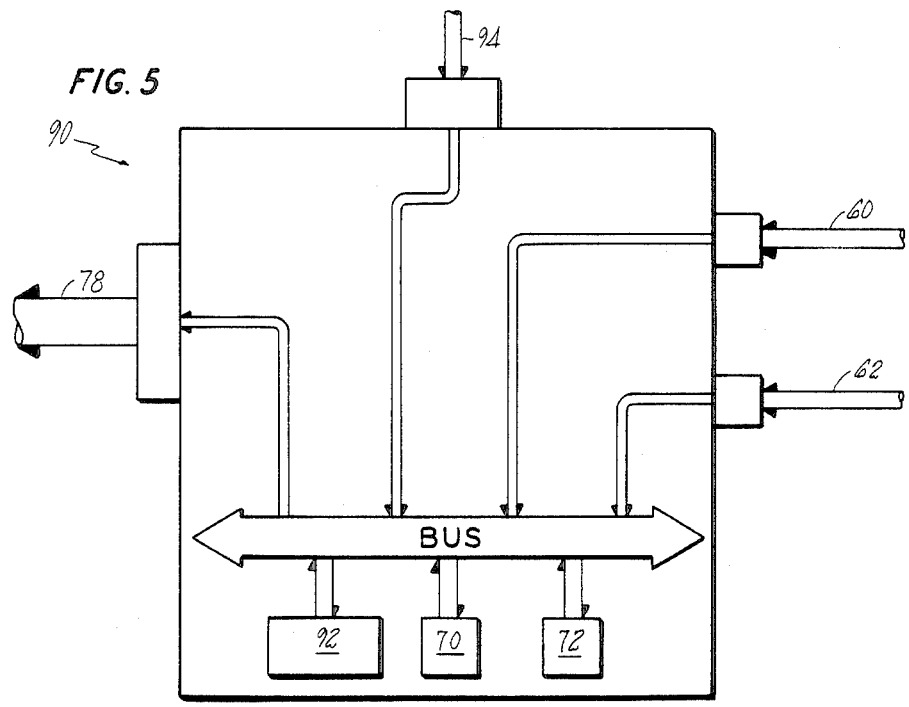
FIG. 5 is a detailed schematic illustration of an alternative embodiment of the signal processor of FIG. 3.

FIG. 5 is a detailed schematic illustration of an alternative embodiment 90 of the digital signal processor of FIG. 3. The alternative signal processor is characterized by a lookup table signal compilation relating energy ratio (R) signals to fireball equivalent black body temperature signals stored in read only memory 92 along with signals described hereinabove with respect to ROM 74 of FIG. 3. The energy ratio signals correspond to fireball equivalent black body temperature signals provided on lines 94 by external processing apparatus, not shown and not part of the present invention. In response thereto, the signal processor initially selects the corresponding value of R in memory and proceeds to compute the reflected corrected energy signal as detailed hereinabove with respect to FIG. 3. In all other aspects the signal processor of FIG. 4 is identical to that of FIG. 3.

Moreover, it is apparent to those skilled in the art that alternative algorithms employing other analog or digital hardware and software can be equivalently substituted.

Similarly, although the invention has been shown and described with respect to a best mode embodiment thereof it should be understood by those skilled in the art that various other changes, omissions and additions thereto may be made therein without departing from the spirit and scope of the invention.

I claim:

1. A pyrometer for measuring the true temperature of a remote target, comprising:

optical guide means, for receiving a target optical beam having a spectral width, and including an emitted energy component and a reflected energy component from sources in proximity to the target, each energy component having an equivalent black body temperature;

detector module means, for dividing said target optical beam into a filtered optical signal, having a spectral width less than said target optical beam, and an unfiltered optical signal, and for providing electrical signal equivalents thereof;

signal processing means, having a memory means for storing signals, including signals indicative of a plurality of target temperature value signals, each corresponding to an associated one of a plurality of reflection corrected energy (E) signal magnitudes, and including energy ratio signals indicative of the ratio of the unfiltered optical signal magnitude to the filtered signal magnitude, said processing means calculating a reflection corrected energy signal as the difference signal magnitude between said electrical signal equivalents of said filtered optical signal and the product of said energy ratio signal and said unfiltered optical signal, and identifying for each said calculated reflection corrected energy signal with a corresponding one of said plurality of target temperature value signals, and providing output signals indicative thereof.

2. The digital reflection corrected radiosity optical pyrometer of claim 1, wherein said energy ratio signals each correspond to an associated fireball equivalent black body temperature signal magnitude, said signal processor futher identifying received fireball equivalent black body temperature signals with the related energy ratio signal stored in said memory means.

* * * * *

UNITED STATES PATENT AND TRADEMARK OFFICE
CERTIFICATE OF CORRECTION

PATENT NO. : 4,708,474

DATED : November 24, 1987

INVENTOR(S) : Ernesto Suarez-Gonzalez

It is certified that error appears in the above-identified patent and that said Letters Patent is hereby corrected as shown below:

Claim 2, column 8, line 10   delete "digital"

Signed and Sealed this

Thirteenth Day of December, 1988

Attest:

DONALD J. QUIGG

Attesting Officer

Commissioner of Patents and Trademarks